(12) United States Patent
Hayakawa et al.

(10) Patent No.: US 8,162,121 B2
(45) Date of Patent: Apr. 24, 2012

(54) HYDRAULIC CLUTCH DEVICE ACTUATED BY ELECTRIC MOTOR AND CLUTCH LEVER

(75) Inventors: Koshi Hayakawa, Tokyo (JP); Yoshihisa Ieda, Tokyo (JP); Akihiko Tomoda, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 469 days.

(21) Appl. No.: 12/370,982

(22) Filed: Feb. 13, 2009

(65) Prior Publication Data
US 2009/0211870 A1 Aug. 27, 2009

(30) Foreign Application Priority Data
Feb. 21, 2008 (JP) ................................. 2008-040185

(51) Int. Cl.
*F16D 48/06* (2006.01)
*F16D 28/00* (2006.01)
(52) U.S. Cl. ....... 192/83; 192/84.6; 192/85.6; 192/30 W
(58) Field of Classification Search ............... 192/83, 192/84.6, 85.6, 30 W
See application file for complete search history.

(56) References Cited

U.S. PATENT DOCUMENTS

| 5,678,673 A * | 10/1997 | Borschert et al. ............ 192/84.6 |
| 5,839,561 A | 11/1998 | Koda et al. |
| 7,451,864 B2 * | 11/2008 | Kosugi ............................ 192/83 |
| 2009/0057090 A1 * | 3/2009 | Hayakawa et al. ............. 192/83 |
| 2009/0266671 A1 * | 10/2009 | Hayakawa et al. ......... 192/85 R |

FOREIGN PATENT DOCUMENTS

| GB | 2236153 A | 3/1991 |
| JP | 2005-042909 A | 2/2005 |
| WO | 2005/093277 A1 | 10/2005 |

* cited by examiner

*Primary Examiner* — David D Le
*Assistant Examiner* — Jacob S Scott
(74) *Attorney, Agent, or Firm* — Westerman, Hattori, Daniels & Adrian, LLP

(57) ABSTRACT

A clutch actuator device of a saddle-ride-type vehicle includes: a first master cylinder which is generating an oil pressure; a first release cylinder which is performing an engagement/disengagement operation of a clutch upon reception of the oil pressure transmitted from the first master cylinder by way of a first hydraulic pipe; and an actuator which is driving the first master cylinder in automatically performing the engagement/disengagement operation of the clutch. The clutch actuator device includes a seesaw member which constitutes a power transmission member for transmitting an operational force of a clutch lever or a drive force of the actuator to the first master cylinder, and a seesaw member rotational angle sensor which is detecting an operation quantity of the seesaw member.

6 Claims, 10 Drawing Sheets

HYDRAULIC CLUTCH DEVICE ACTUATED BY ELECTRIC MOTOR AND CLUTCH LEVER

TECHNICAL FIELD

The present invention relates to an improvement of a clutch actuator device.

BACKGROUND OF THE INVENTION

A clutch actuator device for use in a motorcycle, which assists an engagement/disengagement operation using an actuator which has an electrically-operated motor, reduces a load of a clutch lever operation of the motorcycle.

As such a conventional clutch actuator device, a clutch actuator device which mounts a sensor for detecting an operation quantity of a clutch lever on a handle bar has also been known (see JP-A-2005-42909, for example).

The clutch actuator device shown in JP-A-2005-42909 is explained hereinafter.

The clutch actuator device is constituted of a rotational angle detection sensor which is fixed to a handle coaxially with a rotary shaft of a clutch lever and detects a tilting angle of the clutch lever, an electrically-operated actuator which is connected to a multi-disc clutch by way of a wire which, in turn, is connected to the clutch lever by way of a wire, and a motor amplifier which controls an electrically-operated motor constituting a drive source of the electrically-operated actuator in response to a rotational angle signal supplied from a rotational angle detection sensor.

SUMMARY OF THE INVENTION

Since the rotational angle detection sensor is fixed to the handle, it is necessary to provide a mounting part for mounting the rotational angle detection sensor on the handle. Accordingly, the number of parts is increased and, at the same time, it is necessary to ensure a mounting space and hence, there may be a case that the degree of freedom in designing the arrangement of parts around the clutch lever is limited.

It is an object of the present invention to provide a clutch actuator device which can enhance the degree of freedom in designing the arrangement of parts around a clutch lever, while allowing the detection of an operation quantity of the clutch lever and realizing the reduction of the number of parts.

The present invention is directed to a clutch actuator device of a saddle-ride-type vehicle which includes: a master cylinder which generates oil pressure; a clutch release cylinder which performs an engagement/disengagement operation of a clutch upon reception of the oil pressure transmitted from the master cylinder by way of a hydraulic pipe; and an actuator which drives the master cylinder in automatically performing the engagement/disengagement operation of the clutch, wherein the clutch actuator device includes a power transmission member which transmits an operational force of a clutch lever or a drive force of the actuator to the master cylinder, and a first operation quantity detector which detects an operation quantity of the power transmission member.

In operation, when the clutch lever is operated, an operational force of the clutch lever is transmitted to the master cylinder by way of the power transmission member and the oil pressure is generated by the master cylinder. As a result, a clutch release cylinder is operated so as to perform the engagement/disengagement operation of the clutch.

Here, the operation quantity of the power transmission member is detected by the first operation quantity detection means, and the power transmission member is operated corresponding to an operation of the clutch lever and hence, the operation quantity of the clutch lever is detected as the operation quantity of the power transmission member by the first operation quantity detector.

When the first operation quantity detector is provided at a place different from the surrounding of the clutch lever, the degree of freedom in designing the arrangement of parts around the clutch lever is enhanced and, further, the number of parts for mounting the first operation quantity detector on the handle can be reduced.

The invention is also characterized in that the actuator, the master cylinder and the power transmission member are mounted in a casing, and the first operation quantity detector is mounted on the casing.

In operation, by mounting the first operation quantity detector on the casing, when the casing is provided at a place other than the surrounding of the clutch lever, the degree of freedom in designing the arrangement of parts around the clutch lever is enhanced and, further, due to mounting of the first operation quantity detector in the casing in which the actuator, the master cylinder and the power transmission member are mounted, it is unnecessary to provide particular parts for mounting the first operation quantity detector.

Further, a housing in which the actuator, the master cylinder and the power transmission member are mounted and the first operation quantity detector are collectively formed into a single unit in a compact shape and hence, man-hours for assembling can be reduced.

The invention is also characterized in that a second operation quantity detector which detects an operation quantity of the actuator is mounted on the casing.

In operation, by mounting the second operation quantity detector on the casing, it is unnecessary to provide particular parts for mounting the second operation quantity detector. Further, the casing, the first operation quantity detector and the second operation quantity detector are collectively formed into a single unit in a compact shape and, further, respective wirings of the first operation quantity detector and the second operation quantity detector can be collected.

The invention is also characterized in that the actuator is constituted of an electrically-operated motor, a worm which is mounted on a rotary shaft of the electrically-operated motor and a worm wheel which is meshed with the worm, wherein power is transmitted from the worm wheel to the master cylinder by way of the power transmission member, the worm wheel and the power transmission member are supported on the same shaft to rotate relative to each other, and the second operation quantity detector is provided for detecting a rotational angle of a rotary shaft of the worm wheel.

In operation, when the electrically-operated motor is operated, the worm mounted on the rotary shaft of the electrically-operated motor is rotated, and the worm wheel which is meshed with the worm is rotated. As a result, power is transmitted to the master cylinder from the worm wheel by way of the power transmission member and hence, the oil pressure for engagement disengaging the clutch is generated by the master cylinder.

The power transmission member and the worm wheel are mounted on the same shaft to rotate relative to each other and hence, when the power transmission member is rotated, the rotational angle is detected by the first operation quantity detector as the operation quantity of the power transmission member, while when the worm wheel is rotated, the rotational angle of the rotary shaft of the worm wheel is detected by the second operation quantity detector.

The invention is also characterized in that the first operation quantity detector is arranged on an opposite side of the rotary shaft of the worm wheel with respect detector, such that the rotary shaft is sandwiched between the first operation quantity detector and the second operation quantity detector in the axial direction.

In operation, the first operation quantity detector is arranged on one end side of the rotary shaft of the worm wheel and the second operation quantity detector is arranged on the other end side of the rotary shaft in a state that the rotary shaft is axially sandwiched between these operation quantity detectors and hence, the respective rotational angles of the power transmission member and the worm wheel can be detected whereby the arrangement of the first operation quantity detector and the second operation quantity detector can be easily performed.

According to a first aspect of invention, the clutch actuator device includes the power transmission member which transmits the operation force of the clutch lever or the drive force of the actuator to the master cylinder and the first operation quantity detector which detects the operation quantity of the power transmission member. Due to such constitution, it is possible to detect the manipulated quantity of the clutch lever by detecting the operation quantity of the power transmission member which is operated by the operation of the clutch lever, instead of the operation quantity of the clutch lever. Hence, it is unnecessary to provide a sensor around the clutch lever, thus the sensor mounting parts become unnecessary, leading to the reduction of number of parts and the enhancement of the degree of freedom in designing the arrangement of parts around the clutch lever.

According to a second aspect of the invention, the actuator, the master cylinder and the power transmission member are mounted in the casing, and the first operation quantity detector is mounted on the casing and hence, the first operation quantity detector is mounted on the casing in which actuator and the like are mounted. Accordingly, it is unnecessary to additionally provide a mounting member for the first operation quantity detector and hence, the degree of freedom in designing the arrangement of parts around the clutch lever can be enhanced. Further, the clutch actuator device can be formed in a compact shape and, at the same time, man-hours for assembling can be reduced.

According to a third aspect of the invention, the second operation quantity detector, which detects the operation quantity of the actuator, is mounted on the casing and hence, the second operation quantity detector is mounted on the same casing on which the first operation quantity detector is mounted. Accordingly, it is unnecessary to additionally provide a mounting member and hence, the first operation quantity detector and the second operation quantity detector can be collected together whereby it is possible to prevent wiring from becoming complicated. Further, the clutch actuator device can be formed in a more compact shape.

According to a fourth aspect of the invention, the actuator is constituted of the electrically-operated motor, the worm which is mounted on the rotary shaft of the electrically-operated motor and the worm wheel which is meshed with the worm, wherein power is transmitted from the worm wheel to the master cylinder by way of the power transmission member, the worm wheel and the power transmission member are supported on the same shaft to rotate relative to each other, and the second operation quantity detector is provided for detecting a rotational angle of a rotary shaft of the worm wheel. Accordingly, the first operation quantity detector and the second operation quantity detector respectively detect the respective operation quantities of the power transmission member and the worm wheel which are rotated on the same axis and hence, the first operation quantity detector and the second operation quantity detector can be arranged in a compact shape whereby the clutch actuator device can be miniaturized.

According to a fifth aspect of the invention, the first operation quantity detector is arranged on an opposite side of the rotary shaft of the worm wheel with respect to the second operation quantity detector, such that the rotary shaft is sandwiched between the first operation quantity detector and the second operation quantity detector in the axial direction. Accordingly, the first operation quantity detector and the second operation quantity detector can be easily arranged on both sides of the rotary shaft of the worm wheel and, at the same time, the operation quantity of the power transmission member and the rotation of the rotary shaft of the worm wheel can be efficiently detected by the first operation quantity detector and the second operation quantity detector.

BRIEF DESCRIPTION OF THE DRAWINGS

The advantages of the invention will become apparent in the following description taken in conjunction with the drawings, wherein.

DETAILED DESCRIPTION OF THE INVENTION

The present invention is explained in conjunction with attached drawings hereinafter. Here, the drawings are viewed in the direction of numerals.

Figure 1:
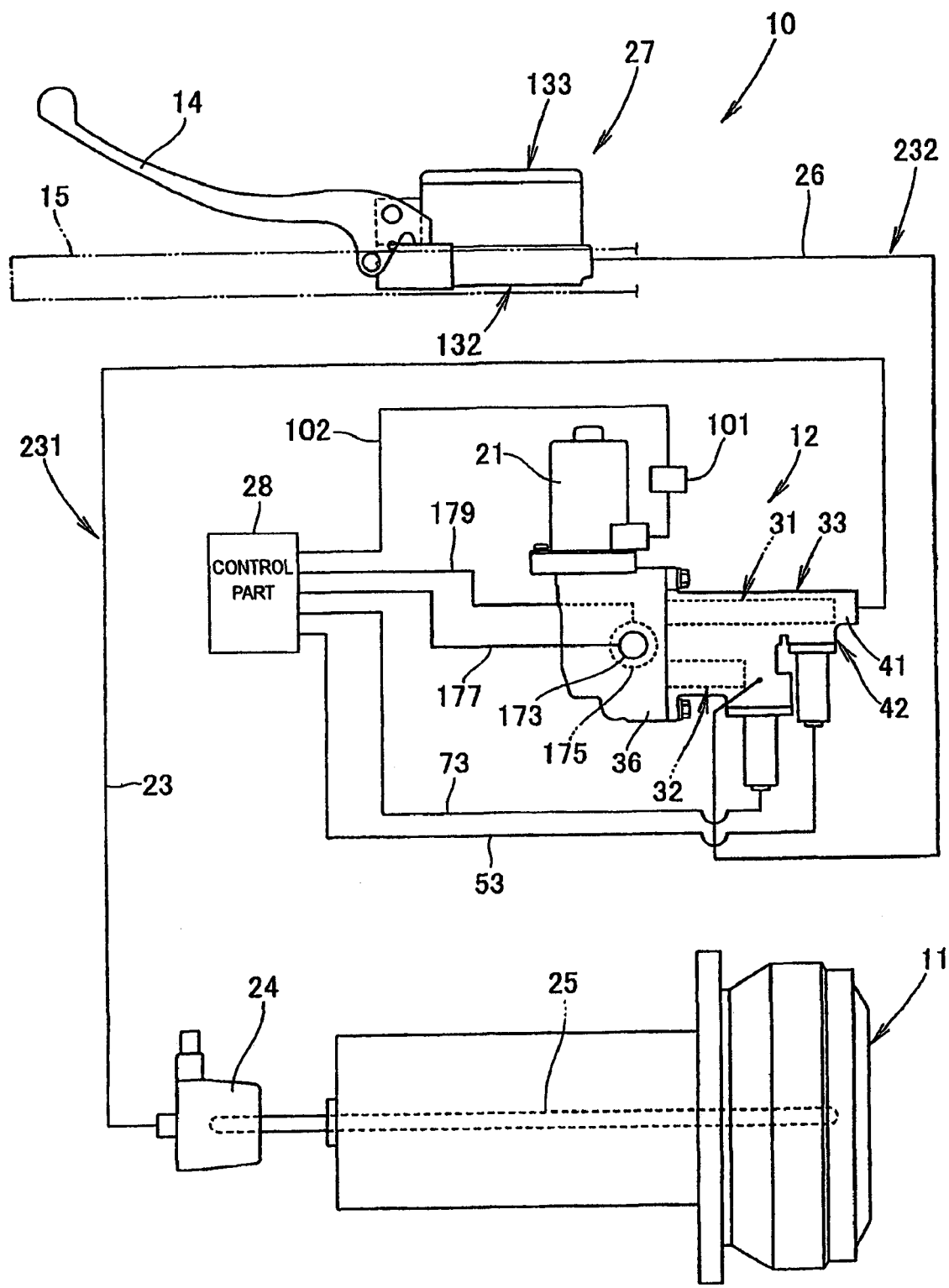
FIG. 1 is a system view showing a clutch actuator device according to the present invention.

FIG. 1 is a system view showing a clutch actuator device according to the present invention. A clutch actuator device 10 is a device which, in performing transmission/interruption of power between an engine and a transmission provided to a saddle-ride-type vehicle such as a motorcycle or an all-terrain vehicle using a clutch 11, can usually automatically disengage or engage (that is, connect or disconnect) the clutch 11 using an actuator 12 at the time of gear change by detecting a stepping force of a clutch pedal, a vehicle speed or the like, for example, and can also manually disengage or engage the clutch 11 using a clutch lever 14 when necessary.

The clutch actuator device 10 is constituted of the actuator 12 which includes an electrically-operated motor 21 constituting a drive source for generating an oil pressure, a first release cylinder 24 which is connected to the actuator 12 by way of a first hydraulic pipe 23, a push rod 25 which is arranged between the first release cylinder 24 and the clutch 11, a lever operation portion 27 which is mounted on a bar handle 15 of the motorcycle and is connected to the actuator 12 by way of a second hydraulic pipe 26, and a control part 28 which controls an operation of the electrically-operated motor 21 of the actuator 12 in response to input signals from various sensors (described in detail later) mounted on the actuator 12 or a signal such as a gear position of the transmission, an engine rotational speed, a vehicle speed and throttle opening acquired from an engine control unit (not shown in the drawing).

In the above-mentioned clutch actuator device 10, an oil pressure is generated by operating the electrically-operated motor 21 of the actuator 12, and the oil pressure is transmitted to the first release cylinder 24 so as to automatically disengage the clutch 11 by way of the push rod 25. Alternatively, the clutch lever 14 mounted on the lever operation portion 27 is operated so as to allow the lever operation portion 27 to generate an oil pressure, and the oil pressure is transmitted to the first release cylinder 24 by way of the second hydraulic pipe 26, the actuator 12 and the first hydraulic pipe 23 sequentially thus manually disengaging the clutch 11 by way of the push rod 25. To engage the clutch 11, the above-mentioned oil pressure is lowered.

Figure 2:
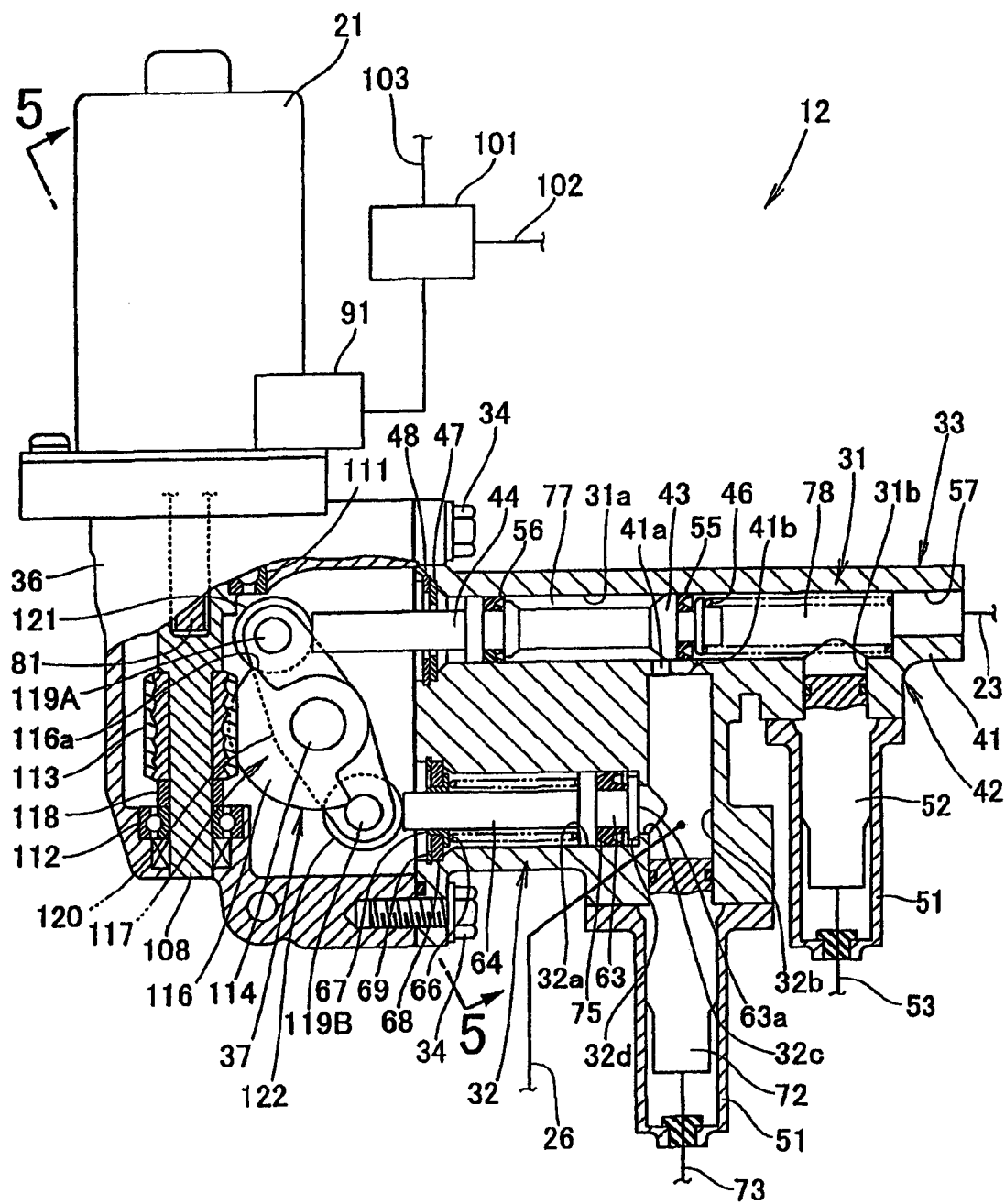
FIG. 2 is an explanatory view showing an actuator of the clutch actuator device according to the present invention.

FIG. 2 is an explanatory view showing the actuator of the clutch actuator device according to the present invention. The actuator 12 is constituted of a cylinder forming portion 33 which includes a first master cylinder 31 and a second release cylinder 32, a gear casing 36 which is mounted on a side surface of the cylinder forming portion 33 using a plurality of bolts 34, the electrically-operated motor 21 which is mounted on an upper portion of the gear casing 36, and a power transmission part 37 which transmits a drive force of the electrically-operated motor 21 to the first master cylinder 31 or transmits a pushing force produced by an oil pressure generated in the second release cylinder 32 to the first master cylinder 31.

The cylinder forming portion 33 includes a cylinder block 41 in which a first cylinder bore 31a of the first master cylinder 31 and a second cylinder bore 32a of the second release cylinder 32, which is arranged below the first master cylinder 31, in parallel are formed in parallel.

The above-mentioned cylinder block 41 and the gear casing 36 are parts which constitute a casing 42.

The first master cylinder 31 is constituted of the cylinder block 41 formed by aluminum-alloy casting (for example, die-cast molding), the first cylinder bore 31a, a piston 43 which is movably inserted into the first cylinder bore 31a, a rod 44 which is integrally formed with the piston 43, a compression coil spring 46 which is arranged between one end of the piston 43 and one end portion of the first cylinder bore 31a for biasing the piston 43 and the rod 44 toward the power transmission part 37, and a washer 47 and a retainer 48 which are mounted on another end portion of the first cylinder bore 31a for preventing the removal of the piston 43 from the first cylinder bore 31a.

The first cylinder bore 31a and the second cylinder bore 32a of the cylinder block 41 are formed from the same direction, that is, from a left side in the drawing. Accordingly, respective forming accuracies of the first cylinder bore 31a and the second cylinder bore 32a and respective positional accuracies (including the parallelism) of the first cylinder bore 31a and the second cylinder bore 32a can be enhanced.

A pressure of oil in the first cylinder bore 31a (that is, a pressure of oil in the first hydraulic pipe 23) is detected by an oil-pressure sensor 52 which is mounted on a first communication hole 31b communicated with the first cylinder bore 31a from below using a mounting tool 51. Here, numeral 53 indicates a lead line for supplying an oil-pressure signal of the oil-pressure sensor 52 to the control part 28 (see FIG. 1).

In the drawing, numerals 55, 56 respectively indicate a rubber-made primary cup and a rubber-made secondary cup which are mounted on the piston 43 for ensuring sealing between the piston 43 and the first cylinder bore 31a, and numeral 57 indicates a pipe connection port which is formed in one end portion of the first cylinder bore 31a for communicably connecting the first hydraulic pipe 23 to the first cylinder bore 31a.

The second release cylinder 32 is constituted of the cylinder block 41, a piston 63 which is movably inserted into the second cylinder bore 32a, a rod 64 which is integrally formed with the piston 63, a compression coil spring 66 which has one end thereof brought into contact with the piston 63 for biasing the piston 63 and the rod 64 to a side opposite to the power transmission part 37, a spring receiving member 67 which receives another end of the compression coil spring 66, and a washer 68 and a retainer 69 which are mounted in the second cylinder bore 32a for supporting the spring receiving member 67.

A pressure of oil in the second cylinder bore 32a (that is, a pressure of oil in the second hydraulic pipe 26) is detected by an oil-pressure sensor 72 which is mounted in a second communication bore 32b which is communicated with the second cylinder bore 32a from below by way of a communication port 32c using the mounting tool 51. Here, numeral 73 indicates a lead line which supplies an oil-pressure signal of the oil-pressure sensor 72 to the control part 28.

In the drawing, numeral 32d indicates a stepped portion which is formed between the second cylinder bore 32a and the communication port 32c, and an end surface 63a of the piston 63 is brought into pressure contact with the stepped portion 32d by the compression coil spring 66. Numeral 75 indicates a rubber-made cup which is mounted on the piston 63 for ensuring sealing between the piston 63 and the second cylinder bore 32a.

The second communication bore 32b is communicated with the first cylinder bore 31a through a large-diameter hole 41a and a small-diameter hole 41b.

The large-diameter hole 41a and small-diameter hole 41b are formed in a lower side of the first cylinder bore 31a, and are provided for supplying oil in a reservoir tank (explained in detail in FIG. 3) mounted on the lever operation portion 27 (see FIG. 1) to both of the first master cylinder 31 and the second release cylinder 32. Due to this constitution, even when a quantity of oil in all hydraulic passages in the clutch actuator device 10 (see FIG. 1) is changed due to a change of temperature, a change of wear of a friction material of the clutch 11 (see FIG. 1) or the like, oil in the reservoir tank is supplied to the hydraulic passages or oil is collected to the inside of the reservoir tank from the inside of the respective hydraulic passages.

Two holes, that is, the large-diameter hole 41a and the small-diameter hole 41b are provided for allowing both of two oil chambers 77, 78 formed on both sides of the primary cup 55 arranged in the inside of the first cylinder bore 31a and the second communication bore 32b to communicate with each other, thus allowing the supply/discharge of oil to and from the oil chambers 77, 78 and the second communication bore 32b.

In the actuator 12 of this embodiment, to be more specific, in the cylinder forming portion 33, the primary cup 55 of the first master cylinder 31 is arranged closer to the first hydraulic pipe 23 side rather than an end portion of the second release cylinder 32 (to be more specific, the second cylinder bore 32a) and hence, the second communication bore 32b can be arranged close to the second cylinder bore 32a. Thus, the large-diameter hole 41a and the small-diameter hole 41b, which allow the second communication bore 32b and the first cylinder bore 31a to communicate with each other, can be formed in a simple shape, that is, in a straight, short and circular shape. Accordingly, it is possible to realize space saving and the reduction of a manufacturing cost.

The electrically-operated motor 21 includes a rotary shaft 81 which extends orthogonally and a power-supply-use connector 91.

In the drawing, numeral 101 indicates a motor drive part which drives the electrically-operated motor 21 and is connected to the control part 28 (see FIG. 1) by way of a lead line 102. The motor drive part 101 drives (normal rotation or reverse rotation) or stops the electrically-operated motor 21 by controlling the supply of electricity to the electrically-operated motor 21 through a power-supply-use lead line 103 connected to the power-supply-use connector 91 in response to a control signal from the control part 28.

The power transmission part 37 is constituted of an extension shaft 108 which is joined to a lower end of the rotary shaft 81 of the electrically-operated motor 21 and is rotatably supported on the gear casing 36 by way of bearings 111, 112, a worm 113 which is mounted on the extension shaft 108, a support shaft 114 which is rotatably mounted on the gear casing 36, a fan-shaped worm wheel 116 which is mounted on the support shaft 114 and is meshed with the worm 113, and a seesaw member 117 which is rotatably mounted on the support shaft 114. Here, numeral 118 indicates a collar which is arranged between the bearing 112 and the worm 113.

The seesaw member 117 includes a seesaw body 120 which is rotatably supported on the support shaft 114, and a first roller 121 and a second roller 122 which are respectively rotatably mounted on both ends of the seesaw body 120 by way of support shafts 119A, 119B.

The support shaft 119A on a first roller 121 side is arranged such that one end portion 116a of the worm wheel 116 is brought into contact with the support shaft 119A.

The first roller 121 is a member which is provided for pushing the rod 44 of the first master cylinder 31 against a resilient force of the compression coil spring 46.

The second roller 122 is a member which is pushed by the rod 64 of the second release cylinder 32. When the second roller 122 is pushed by the rod member 64, the seesaw member 117 is rotated in the clockwise direction about the support shaft 114, and the first roller 121 pushes the rod 44 rightward in the drawing.

The worm 113 of the power transmission part 37 is arranged below the electrically-operated motor 21. Accordingly, when wear debris is generated in a portion where the worm 113 and the worm wheel 116 are meshed with each other, it is possible to make the wear debris fall in the downward direction and hence, there exists no possibility that the operation of the electrically-operated motor 21 is influenced by the wear debris.

Figure 3:
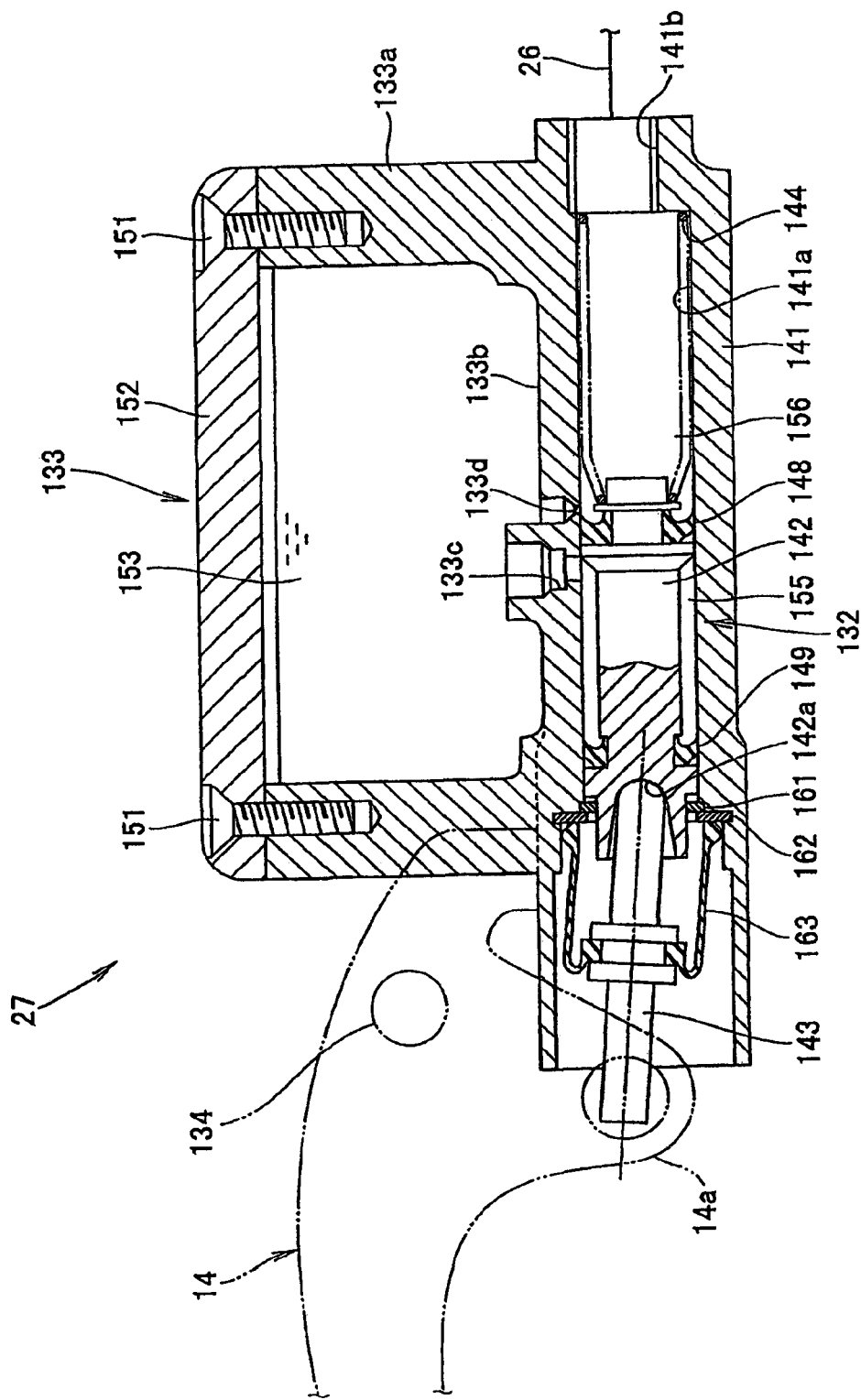
FIG. 3 is across-sectional view showing a lever operation portion of the clutch actuator device according to the present invention.

FIG. 3 is a cross-sectional view showing the lever operation portion of the clutch actuator device according to the present invention. The lever operation portion 27 is constituted of the clutch lever 14, a second master cylinder 132 which generates an oil pressure due to an operation of the clutch lever 14, and a reservoir tank 133 which is integrally formed with the second master cylinder 132. Here, numeral 134 indicates a tilting shaft of the clutch lever 14.

The second master cylinder 132 is constituted of a cylindrical cylinder body 141, a piston 142 which is movably inserted into a cylinder bore 141a formed in the cylinder body 141, a rod 143 which has a first end thereof joined to an arm portion 14a of the clutch lever 14 for pushing the piston 142 and a second end thereof inserted into a recessed portion 142a of the piston 142, and a spring 144 which pushes the piston 142 toward the rod 143. The second hydraulic pipe 26 is connected to a pipe connection port 141b formed in an end portion of the cylinder body 141. Here, numerals 148, 149 respectively indicate a rubber-made primary cup and a rubber-made secondary cup which are mounted on the piston 142 for ensuring sealing between the piston 142 and the cylinder bore 141a.

The reservoir tank 133 is constituted of a main body portion 133a which is integrally formed with the cylinder body 141, and a cover portion 152 which is mounted on the main body portion 133a for closing an opening formed in an upper portion of the main body portion 133a using a plurality of screws 151, and oil 153 is accumulated in the reservoir tank 133. As shown in FIG. 1, the reservoir tank 133 is mounted on the bar handle 15 and is arranged at a highest position of a vehicle body of a vehicle (this position also being a position where a quantity of the oil 153 can be easily confirmed or oil can be easily replenished).

In a bottom portion 133b of the main body portion 133a, a large-diameter hole 133c and a small-diameter hole 133d, which communicate with the inside of the cylinder bore 141a of the second master cylinder 132, are formed. Accordingly, even when a quantity of oil in all hydraulic passages (that is, a first hydraulic passage 231 and a second hydraulic passage 232 described later (see FIG. 1)) in the inside of the clutch actuator device 10 (see FIG. 1) is changed due to a change of temperature, wear of a friction material of the clutch 11 (see FIG. 1) or the like, the oil 153 in the reservoir tank 133 is supplied to the respective passages, or oil is collected to the inside of the reservoir tank 133 through the hydraulic passages.

Two holes, that is, the large-diameter hole 133c and the small-diameter hole 133d are provided for supplying the oil 153 to both of two oil chambers 155, 156 formed on both sides of the primary cup 148 arranged in the cylinder bore 141 a or collecting the oil 153 from both oil chambers 155, 156.

Here, numeral 161 indicates a washer for preventing the removal of the piston 142 from the cylinder bore 141a, numeral 162 indicates a retainer for fixing the washer 161 to the cylinder body 141, and numeral 163 indicates a dust cover.

Figure 4:
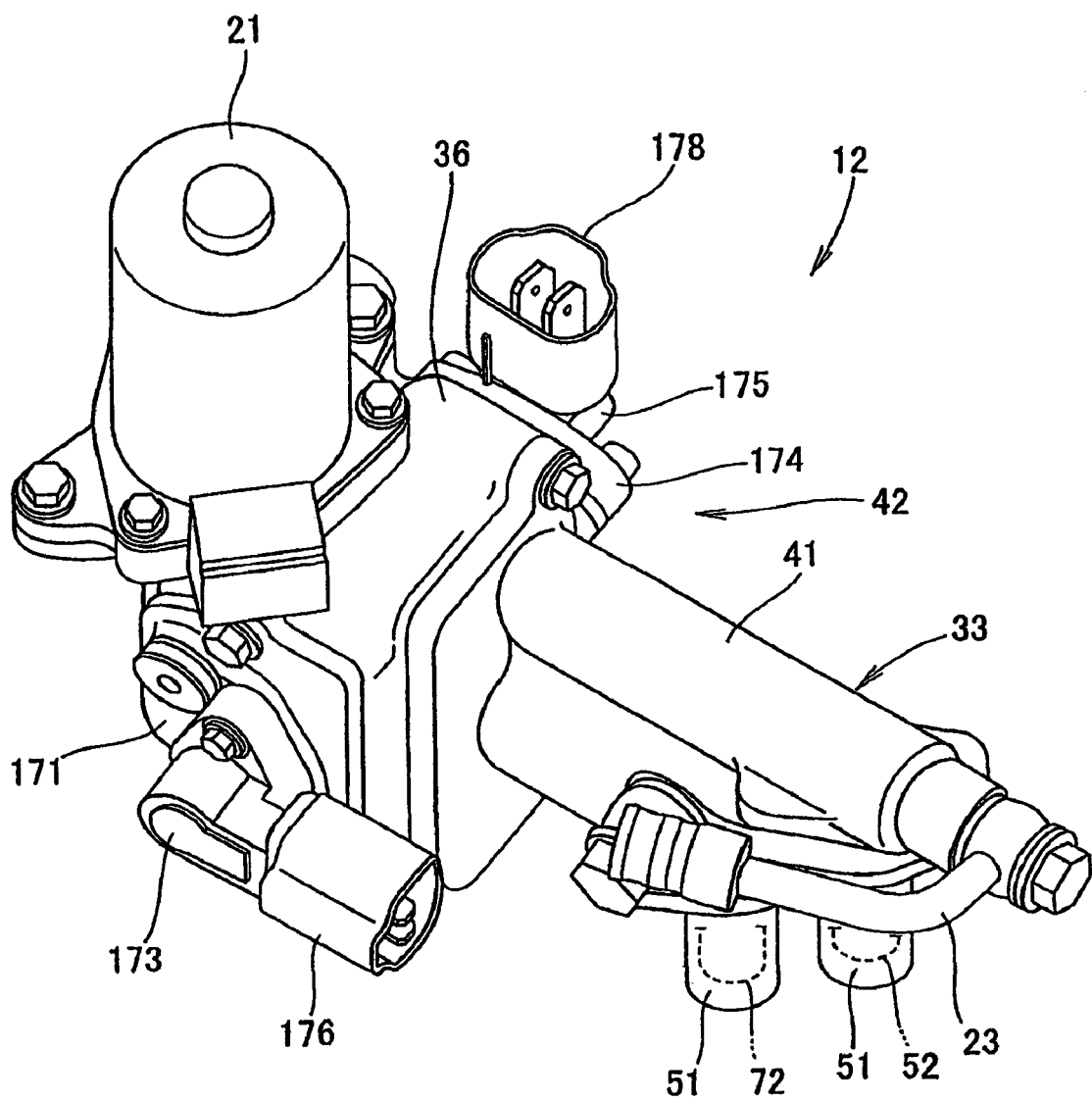
FIG. 4 is a perspective view of the actuator according to the present invention.

FIG. 4 is a perspective view of the actuator according to the present invention. In FIG. 4, the gear casing 36 of the actuator 12 forms an opening (not shown in the drawing) in one side surface thereof and includes a cover member 171 which closes the opening and rotatably supports one end of the support shaft 114 (see FIG. 2) of the power transmission part 37 (see FIG. 2). A worm wheel rotational angle sensor 173 which detects a rotational angle of the worm wheel 116 (see FIG. 2) is mounted on the cover member 171 by way of the support shaft 114.

Further, the gear casing 36 forms an opening (not shown in the drawing) also in another side surface thereof and includes a cover member 174 which closes the opening and is arranged on another end side of the support shaft 114. A seesaw member rotational angle sensor 175 which detects a rotational angle of the seesaw member 117 (see FIG. 2) is mounted on the cover member 174.

Here, numeral 176 indicates a connector for connecting an output signal of the worm wheel rotational angle sensor 173 to the control part 28 (see FIG. 1) via a lead line 177 (see FIG. 1), and numeral 178 indicates a connector for connecting an output signal of the seesaw member rotational angle sensor 175 to the control part 28 (see FIG. 1) via a lead line 179 (see FIG. 1).

Figure 5:
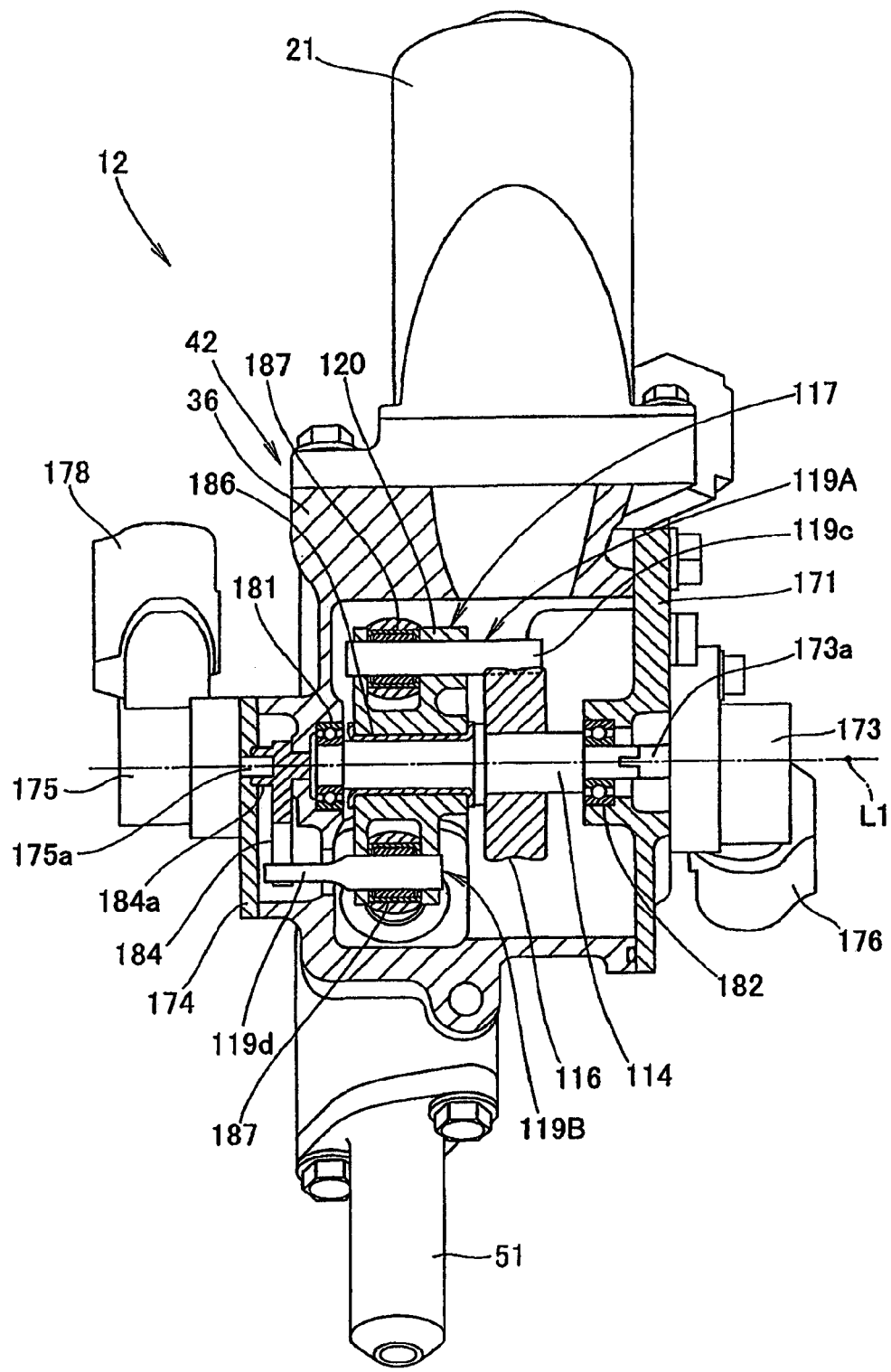
FIG. 5 is a cross-sectional view taken along a line 5-5 in FIG. 2.

FIG. 5 is a cross-sectional view taken along a line 5-5 in FIG. 2. The support shaft 114 is rotatably supported on a bearing 181 mounted on the gear casing 36 and a bearing 182 mounted on the cover member 171, a rotary shaft 173a of a worm wheel rotational angle sensor 173 is joined to one end of the support shaft 114, and the worm wheel 116 is press-fitted on the support shaft 114 and hence, the worm wheel rotational angle sensor 173 is integrally rotated with the worm wheel 116.

Here, in the drawing, symbol L1 indicates a rotational axis of the support shaft 114 and the worm wheel 116.

One support shaft 119A of the seesaw member 117 includes a support-shaft extension portion 119c which extends toward the worm wheel 116, and one end portion 116a of the worm wheel 116 (see FIG. 2) is brought into contact with the support-shaft extending portion 119c.

Another support shaft 119B of the seesaw member 117 includes a support-shaft extension portion 119d which extends toward a side opposite to the worm wheel 116, and a distal end portion of an arm member 184 which is provided tiltably and coaxially with the seesaw member 117 is engaged with a distal end portion of the support-shaft extension portion 119d.

A shaft portion 184a is integrally formed on the arm member 184, and the shaft portion 184a is tiltably sandwiched between the gear case 36 and the cover member 174 on an extension of the support shaft 114. A rotary shaft 175a of the seesaw member rotational angle sensor 175 is joined to an end portion of the shaft portion 184a on a cover member 174 side. Accordingly, when the seesaw member 117 is tilted about the support shaft 114 (rotary axis L1), the arm member 184 is tilted about the rotary axis L1 along with such tilting of the seesaw member 117, and the rotary shaft 175a of the seesaw member rotational angle sensor 175 is rotated. That is, a rotational angle of the seesaw member 117 is detected by the seesaw member rotational angle sensor 175. Here, numeral 186 indicates a bushing provided between the support shaft 114 and the seesaw body 120, numeral 187 indicates needle bearings which are respectively provided between the support shaft 119A and the first roller 121 as well as between the support shaft 119B and the second roller 122.

The rotary shaft 175a of the seesaw member rotational angle sensor 175 and the rotary shaft 173a of the worm wheel rotational angle sensor 173 are arranged on the same rotary axis L1.

Figure 6:
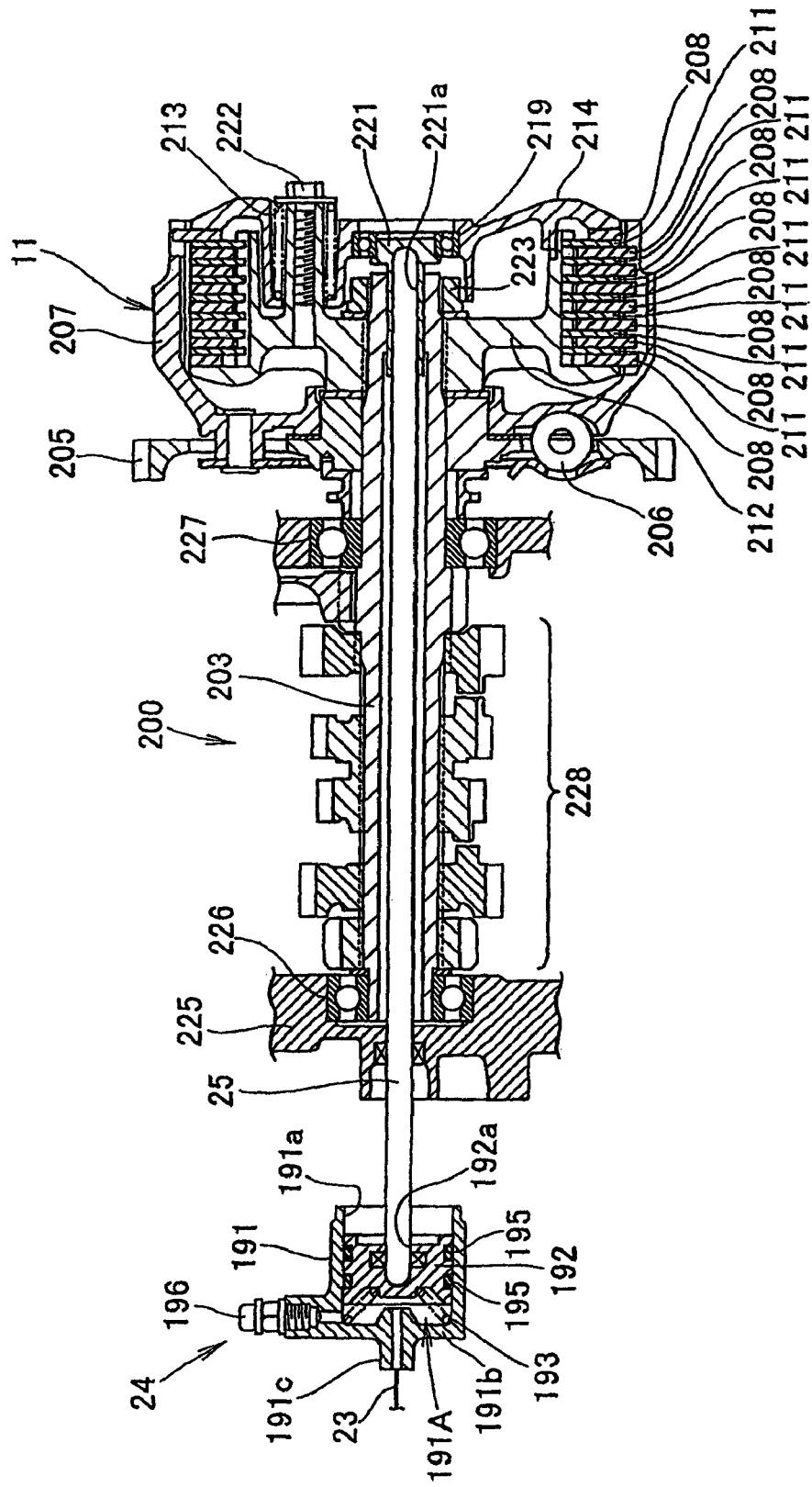
FIG. 6 is a cross-sectional view for explaining a first release cylinder and a clutch according to the present invention.

FIG. 6 is a cross-sectional view explaining the first release cylinder and the clutch according to the present invention. The first release cylinder 24 includes a bottomed cylindrical cylinder body 191, a piston 192 which is movably inserted into a cylinder bore 191a formed in the cylinder body 191, and a spring 193 which is provided between the piston 192 and a bottom wall 191b of the cylinder body 191 and pushes the piston 192 toward a push rod 25 side. Here, numeral 191A indicates an oil chamber formed in the cylinder body 191, numeral 191c is a pipe connecting port formed in the bottom wall 191b of the cylinder body 191 to allow the connection of a first hydraulic pipe 23, numerals 195, 195 indicate O-rings which are mounted on the piston 192 for ensuring sealing between the cylinder bore 191a and the piston 192, and numeral 196 indicates an air bleeding plug for removing air mixed into oil in the cylinder body 191.

A rod insertion hole 192a which allows the insertion of one end of the push rod 25 therein is formed in the piston 192.

The clutch 11 is of a multi-disc type which includes a large driven gear 205 which is rotatably mounted on a main shaft 203 which constitutes a transmission 200 and is meshed with a gear on a crankshaft side, a drive member 207 which is mounted on the large driven gear 205 by way of a coil spring 206, a plurality of clutch discs 208 constituting frictional discs which are movable in the axial direction of the main shaft 203 and are rotatably engaged with an inner peripheral surface of the drive member 207, a plurality of clutch plates 211 which are alternately overlapping with these clutch discs 208, a driven member 212 which is mounted on the main shaft 203 by spline fitting and with which inner peripheral portions of the clutch plates 211 are movably and rotatably engaged in the axial direction of the main shaft 203, a pusher member 214 which is mounted on the driven member 212 by way of a plurality of coil springs 213 and pushes the driven member 212 by way of the plurality of clutch discs 208 and the plurality of clutch plates 211, and an input member 221 which is arranged in the pusher member 214 by way of a bearing 219, is mounted movably on an end portion of the main shaft 203 and forms therein a rod insertion hole 221a in which another end portion of the push rod 25 is inserted.

Here, numeral 222 indicates a plurality of bolts for mounting the coil springs 213 which are provided for pushing the pushing member 214 against the driven member 212. Numeral 223 indicates nuts for mounting the driven member 212 on the main shaft 203.

The transmission 200 is configured such that the main shaft 203 is rotatably mounted on the housing 225 by way of bearings 226, 227, and a counter shaft not shown in the drawing is rotatably mounted on the housing 225 by way of a pair of bearings.

A drive gear train 228 which is constituted of a plurality of drive gears is axially movably mounted on the main shaft 203 by spline fitting, and a driven gear train which is constituted of a plurality of driven gears is mounted on the counter shaft by spline fitting. The respective gears of the driven gear train are meshed with the respective gears of the drive gear train 228, and the gears which transmit power are selected by a shift gear mechanism not shown in the drawing.

Returning to FIG. 1, the first master cylinder 31, the first hydraulic pipe 23 and the first release cylinder 24 are parts which constitute a first hydraulic passage 231 which engages/disengages the clutch 11, and the second master cylinder 132, the second hydraulic pipe 26 and the second release cylinder 32 are parts which constitute a second hydraulic passage 232.

The manner of operation of the clutch actuator device 10 having the above-mentioned constitution is explained hereinafter.

Figure 7:
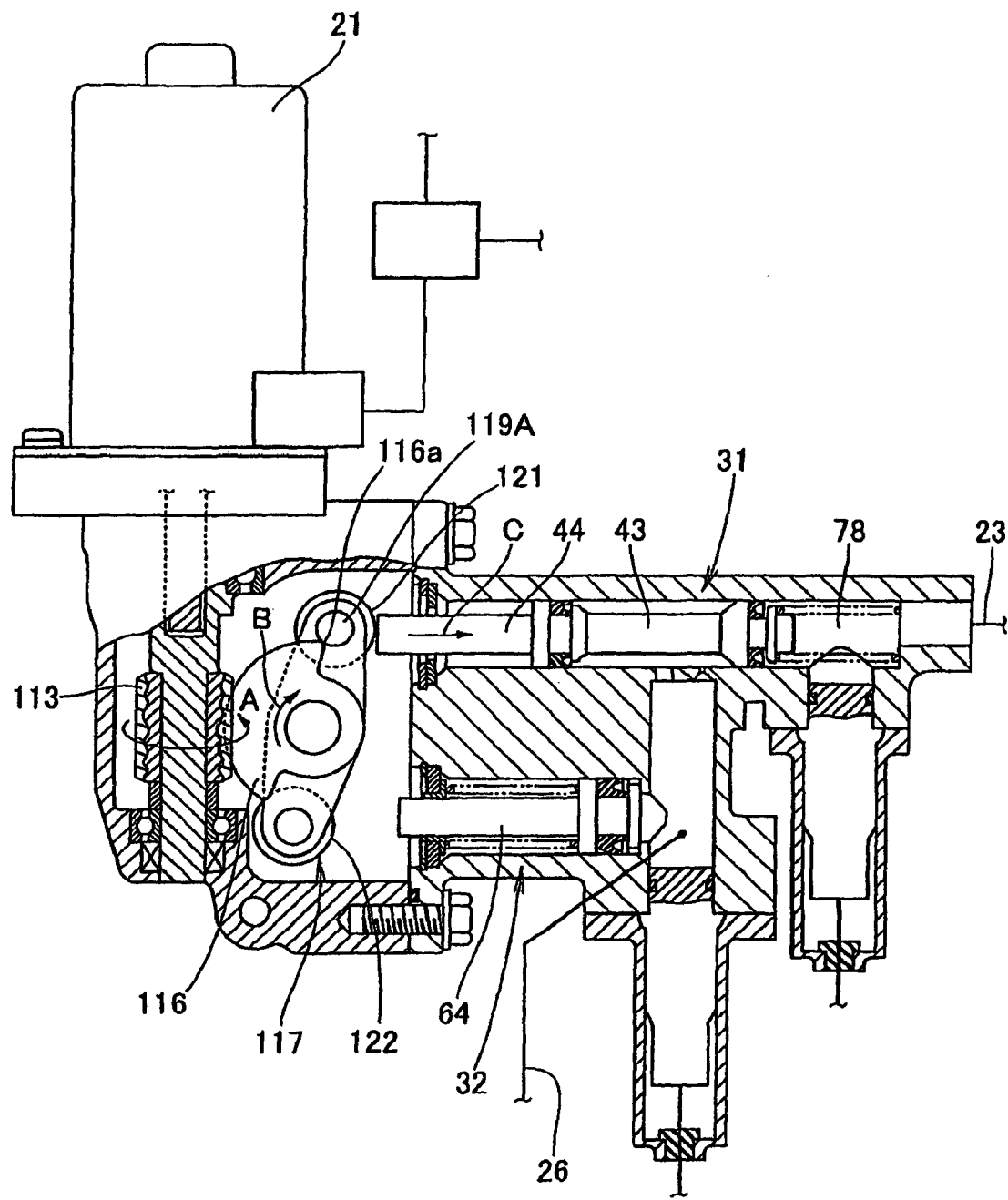
FIG. 7 is a first operational view showing the manner of operation of the clutch actuator device according to the present invention.

FIG. 7 is a first operational view for explaining the manner of operation of the clutch actuator device according to the present invention.

When electricity is supplied to the electrically-operated motor 21 in a state shown in FIG. 2, as shown in FIG. 7, the worm 113 is rotated in the direction indicated by an arrow A and the worm wheel 116 is rotated in the direction indicated by an arrow B. Here, one end portion 116a of the worm wheel 116 pushes the support shaft 119A of the seesaw member 117 and hence, the seesaw member 117 is also rotated together with the worm wheel 116, and the first roller 121 of the seesaw member 117 pushes the rod 44 of the first master cylinder 31 in the direction indicated by an arrow C.

Accordingly, the piston 43 is moved together with the rod 44 and the oil pressure in the oil chamber 78 is elevated. This oil pressure is transmitted to the oil chamber 191A in the cylinder body 191 of the first release cylinder 24 shown in FIG. 6 by way of the first hydraulic pipe 23 so that the oil pressure in the oil chamber 191A is elevated. Accordingly, the piston 192 pushes the push rod 25 so as to move the push rod 25 toward the clutch 11 side.

As a result, the pushing member 214 is separated from the clutch discs 208 against the resilient force of the coil springs 213 by way of the bearing 219 and hence, most of a pushing force which pushes the respective clutch discs 208 and the respective clutch plates 211 is eliminated, therefore the clutch 11 is disengaged. That is, power is not transmitted to the driven member 212 from the drive member 207.

Here, in FIG. 7, the second roller 122 of the seesaw member 117 is moved away from the rod 64 of the second release cylinder 32 held in a stationary state and hence, the operation of the electrically-operated motor 21 does not influence the clutch lever 14 (see FIG. 1) side (that is, second hydraulic passage 232).

Figure 8:
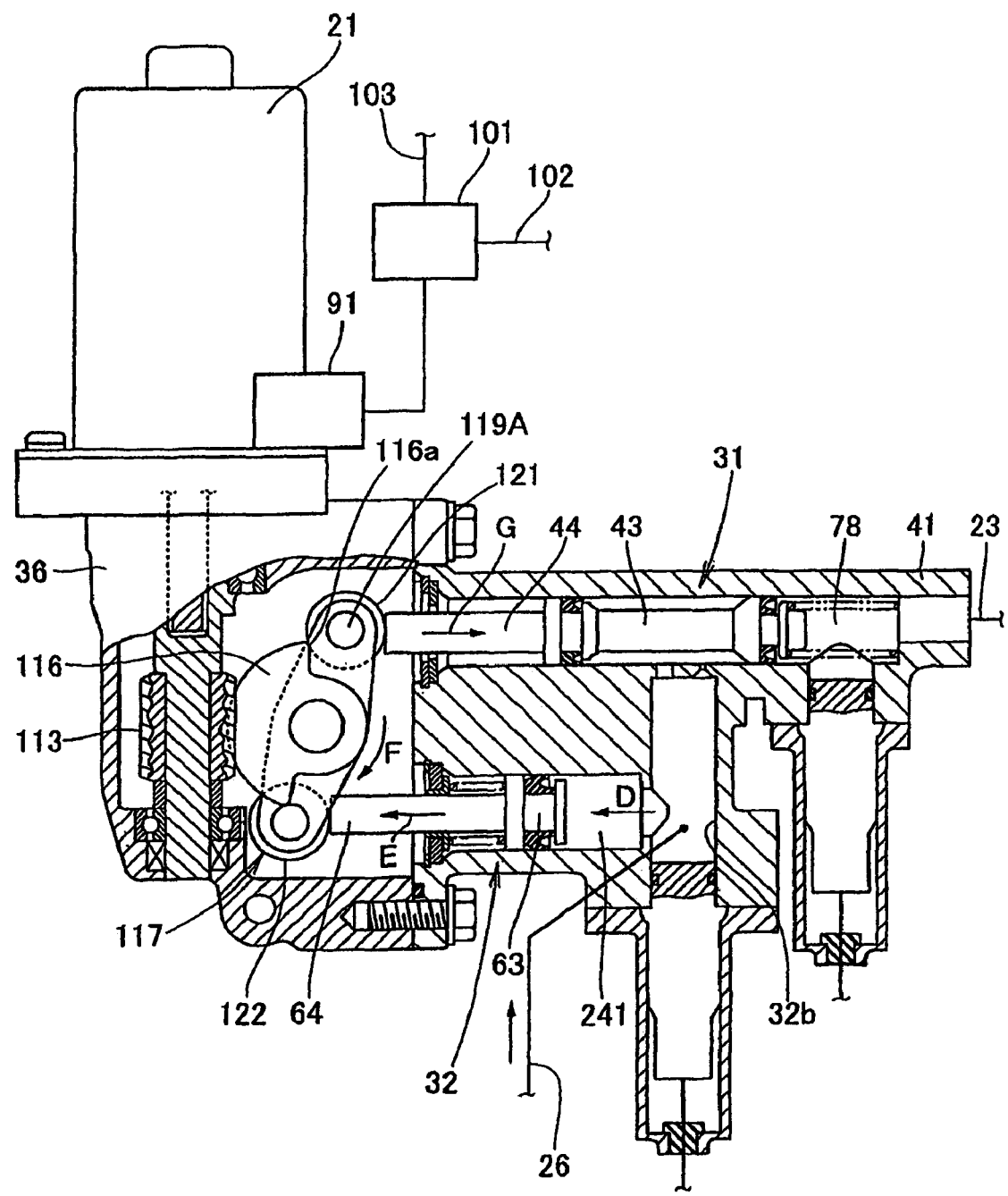
FIG. 8 is a second operational view showing the manner of operation of the clutch actuator device according to the present invention.

FIG. 8 is a second operation view showing the manner of operation of the clutch actuator device according to the present invention.

For example, from the state where the electrically-operated motor 21 shown in FIG. 7 is operated, as shown in FIG. 3, when the clutch lever 14 is operated so as to move the piston 142 of the second master cylinder 132 in the right direction in the drawing thus elevating the oil pressure in the oil chamber 156, the oil pressure is transmitted to the second communication bore 32b shown in FIG. 8 by way of the second hydraulic pipe 26 and, then, is transmitted to the oil chamber 241 of the second release cylinder 32 from the second communication bore 32b as indicated by an arrow D. Accordingly, the piston 63 and the rod 64 are moved in the direction indicated by an arrow E and hence, the rod 64 pushes the second roller 122 of the seesaw member 117.

As a result, the seesaw member 117 is rotated in the direction indicated by an arrow F. Starting of rotation of the seesaw member 117 at this point of time is detected by the seesaw member rotational angle sensor 175 (see FIG. 4), and based on this detection signal, the control part 28 (see FIG. 1) transmits a motor reverse rotation signal to the motor drive part 101 so as to reverse the rotation of the electrically-operated motor 21, and returns the worm wheel 116 to a standby position shown in FIG. 2.

In FIG. 8, a predetermined relationship is set between the rotational angle of the seesaw member 117 and the tilting angle of the clutch lever 14 and hence, it is possible to obtain the tilting angle of the clutch lever 14 by detecting the rotational angle of the seesaw member 117 using the seesaw member rotational angle sensor 175.

Along with the rotation of the seesaw member 117, the first roller 121 moves the rod 44 of the first master cylinder 31 in the direction indicated by an arrow G and hence, the piston 43 is also moved thus elevating the oil pressure in the oil chamber 78. This oil pressure is, in the same manner as the above, transmitted to the oil chamber 191A in the cylinder body 191 of the first release cylinder 24 shown in FIG. 6 by way of the first hydraulic pipe 23 and hence, the push rod 25 moves toward the clutch 11 so as to disengage the clutch 11.

Here, in FIG. 8, the support shaft 119A of the seesaw member 117 moves away from one end portion 116a of the worm wheel 116 and hence, the operation of the clutch lever 14 (see FIG. 3) does not influence the operation of the electrically-operated motor 21.

In this manner, it is possible to operate the electrically-operated motor 21 and the clutch lever 14 independently.

Figure 9A:
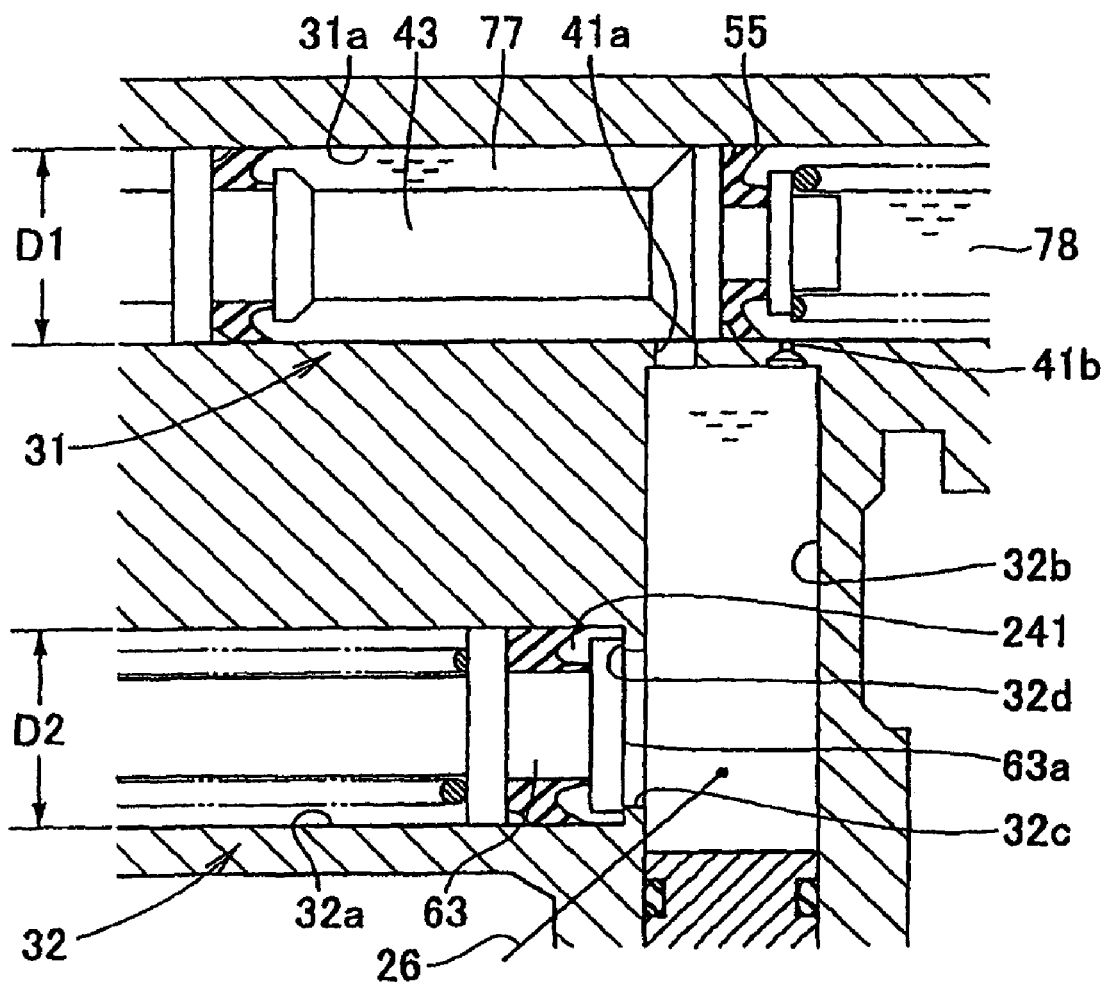
FIG. 9 is a third operational view showing the manner of operation of the clutch actuator device according to the present invention.

FIGS. 9(a), (b) are third operation views showing the manner of operation of the clutch actuator device according to the present invention.

FIG. 9(a) shows a state before the piston 43 of the first master cylinder 31 is moved, that is, a state of the first master cylinder 31 and the second release cylinder 32 shown in FIG. 2.

That is, the primary cup 55 of the first master cylinder 31 is positioned between the large-diameter hole 41a and the small-diameter hole 41b. Further, an end surface 63a of the piston 63 of the second release cylinder 32 is brought into contact with the stepped portion 32d.

When the oil pressure is transmitted to the second communication bore 32b in such a state, the oil pressure acts on the piston 43 from the right side by way of the small-diameter hole 41b and the oil chamber 78 in the first master cylinder 31, while the oil pressure acts on the piston 63 from the right side by way of the communication port 32c and the oil chamber 241 in the second release cylinder 32.

Since an inner diameter D2 of the second cylinder bore 32a is larger than an inner diameter D1 of the first cylinder bore 31a, a pressure receiving area of the piston 63 of the second release cylinder 32 is larger than a pressure receiving area of the piston 43 of the first master cylinder 31. Accordingly, a force which moves the piston 63 leftward becomes larger than a force which moves the piston 43 leftward and hence, the piston 63 is moved leftward and the piston 43 moves rightward.

Figure 9B:
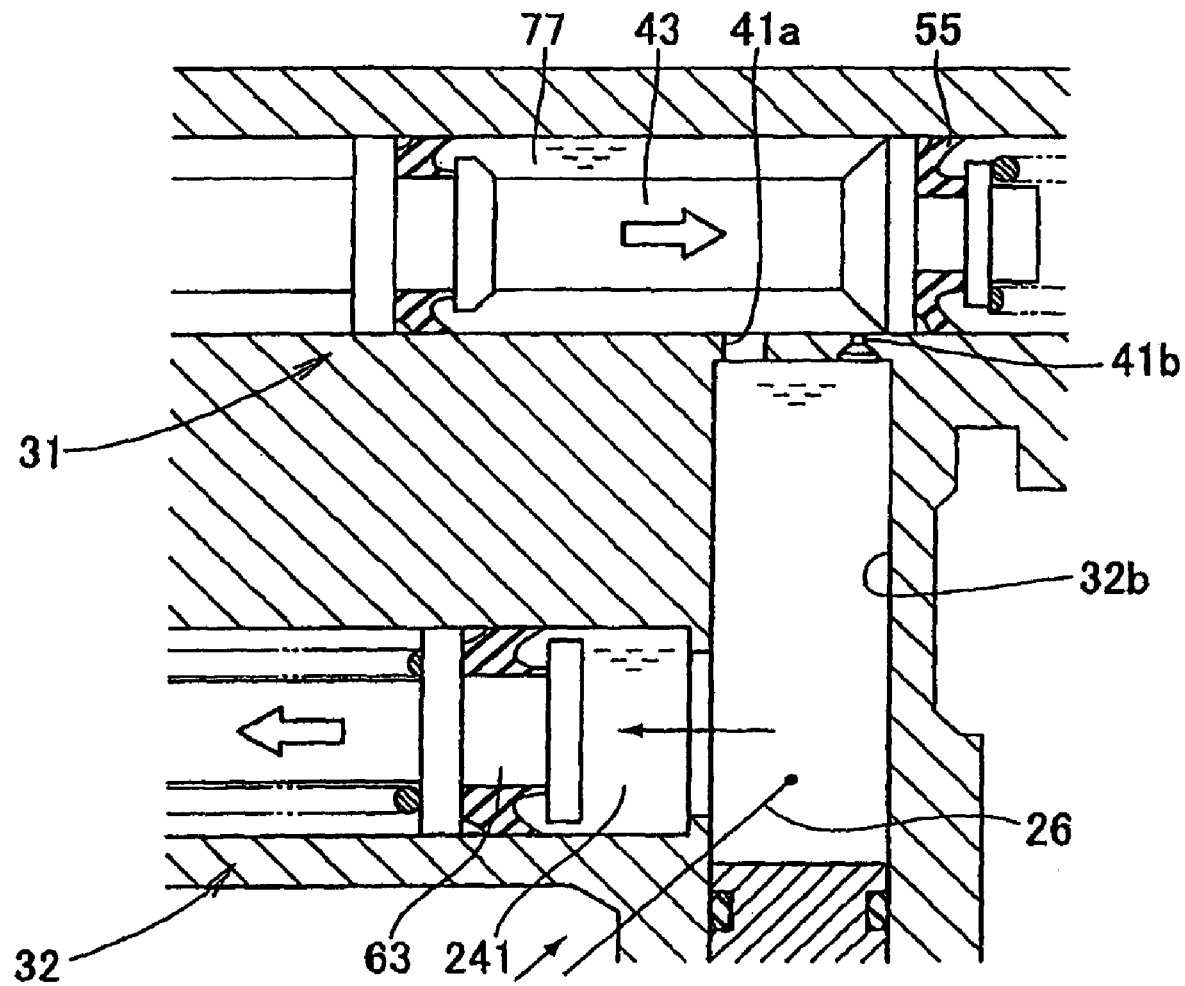

In FIG. 9(b), when the piston 43 moves rightward as indicated by a blanked arrow so that the primary cup 55 is positioned on a right side of the small-diameter hole 41b, both of the large-diameter hole 41a and the small-diameter hole 41b face the oil chamber 77 and hence, power which moves the piston 43 is not generated and only a force which moves the piston 63 due to the oil pressure acting on the oil chamber 241 of the second release cylinder 32 is generated.

As shown in FIG. 1, FIG. 2 and FIG. 5, the present invention is firstly characterized by the clutch actuator device 10 of a saddle-ride-type vehicle which includes: the first master cylinder 31 which generates an oil pressure; the first release cylinder 24 which constitutes the clutch release cylinder for performing an engagement/disengagement operation of a clutch 11 upon reception of the oil pressure transmitted from the first master cylinder 31 by way of the first hydraulic pipe 23; and the actuator 12 which drives the first master cylinder 31 in automatically performing the engagement/disengagement operation of the clutch 11, wherein the clutch actuator device 10 includes the seesaw member 117 which constitutes a power transmission member for transmitting an operational force of the clutch lever 14 or a drive force of the actuator 12 to the first master cylinder 31, and the seesaw member rotational angle sensor 175 which constitutes the first operation quantity detection means for detecting an operation quantity of the seesaw member 117. Due to such constitution, it is possible to detect the manipulated quantity of the clutch lever 14 by detecting the operation quantity of the seesaw member 117 which is operated by the operation of the clutch lever 14, instead of the operation quantity of the clutch lever 14. Hence, it is unnecessary to provide a sensor for detecting the tilting angle of the clutch lever 14 around the clutch lever 14, therefore the sensor mounting parts become unnecessary, leading to the reduction of number of parts and the enhancement of the degree of freedom in designing the arrangement of parts around the clutch lever 14.

As shown in FIG. 2 and FIG. 4, the present invention is secondly characterized in that the actuator 12, the first master cylinder 31 and the seesaw member 117 are mounted in the casing 42, and the seesaw member rotational angle sensor 175 is mounted on the casing 42 and hence, the seesaw member rotational angle sensor 175 is mounted on the casing 42 in which the actuator 12 and the like are mounted. Accordingly, it is unnecessary to additionally provide a mounting member for the seesaw member rotational angle sensor 175 and hence, the degree of freedom in designing the arrangement of parts around the clutch lever 14 can be enhanced. Further, the clutch actuator device 10 can be formed in a compact shape and, at the same time, man-hours for assembling can be reduced.

The present invention is thirdly characterized in that the worm wheel rotational angle sensor 173 which constitutes the second operation quantity detection means for detecting the operation quantity of the actuator 12 is mounted on the casing 42 and hence, the worm wheel rotational angle sensor 173 is mounted on the same casing 42 on which the seesaw member rotational angle sensor 175 is mounted. Accordingly, it is unnecessary to additionally provide a mounting member for mounting the worm wheel rotational angle sensor 173 and hence, the seesaw member rotational angle sensor 175 and the worm wheel rotational angle sensor 173 can be collected together whereby it is possible to prevent wiring from becoming complicated. Further, the clutch actuator device 10 can be formed in a more compact shape.

The present invention is fourthly characterized in that the actuator 12 is constituted of the electrically-operated motor 21, the worm 113 which is mounted on the rotary shaft 81 of the electrically-operated motor 21 and the worm wheel 116 which is meshed with the worm 113, wherein power is transmitted from the worm wheel 116 to the first master cylinder 31 by way of the seesaw member 117, the worm wheel 116 and the seesaw member 117 are supported on the same shaft to rotate relative to each other, and the worm wheel rotational angle sensor 173 is provided for detecting a rotational angle of the support shaft 114 which constitutes a rotary shaft of the worm wheel 116. Accordingly, the seesaw member rotational angle sensor 175 and the worm wheel rotational angle sensor 173 respectively detect the operation quantity of the seesaw member 117 and the operation quantity of the worm wheel 116 on the same axis and hence, the seesaw member rotational angle sensor 175 and the worm wheel rotational angle sensor 173 can be arranged in a compact shape whereby the clutch actuator device 10 can be miniaturized.

The present invention is, as shown in FIG. 5, fifthly characterized in that the seesaw member rotational angle sensor 175 is arranged on an opposite side of the support shaft 114, which constitutes the rotary shaft of the worm wheel 116, with respect to the worm wheel rotational angle sensor 173 and is sandwiched between the seesaw member rotational angle sensor 175 and the worm wheel rotational angle sensor 173 in the axial direction. Accordingly, the seesaw member rotational angle sensor 175 and the worm wheel rotational angle sensor 173 can be easily arranged on both sides of the support shaft 114 of the worm wheel 116 and, at the same time, the operation quantity of the seesaw member 117 and the rotation of the support shaft 114 of the worm wheel 116 can be efficiently detected by the seesaw member rotational angle sensor 175 and the worm wheel rotational angle sensor 173.

As shown in FIG. 5, this embodiment adopts the structure in which the tilting angle of the clutch lever is detected by the seesaw member rotational angle sensor 175 as the rotational angle of the seesaw member 117. However, the present invention is not limited to such structure and may adopt the structure which detects the tilting angle of the clutch lever as a stroke of the piston 63 and the rod 64 of the second release cylinder 32 shown in FIG. 2 using a stroke sensor.

The clutch actuator device of the present invention is preferably applicable to a motorcycle.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A clutch actuator device of a saddle-ride-type vehicle, comprising:

a master cylinder which generates oil pressure;

a clutch release cylinder which performs an engagement/disengagement operation of a clutch upon reception of the oil pressure transmitted from said master cylinder by a hydraulic pipe;

an actuating mechanism which drives said master cylinder to automatically perform the engagement/disengagement operation of said clutch, a power transmission member which transmits an operational force of a clutch lever or a drive force of said actuating mechanism to said master cylinder, and a first operation quantity detector which detects an operation quantity of said power transmission member, wherein said first operation quantity detector is disposed on an opposite side of a rotary shaft supporting a worm wheel with respect to a second operation quantity detector, said rotary shaft being sandwiched between said first operation quantity detector and said second operation quantity detector in the axial direction.

2. A clutch actuator device of a saddle-ride-type vehicle according to claim 1, wherein said actuating mechanism, said master cylinder and said power transmission member are mounted in a casing, and wherein said first operation quantity detector is mounted on said casing.

3. A clutch actuator device of a saddle-ride-type vehicle according to claim 2, wherein said second operation quantity detector which detects an operation quantity of said actuating mechanism is mounted on said casing.

4. A clutch actuator device of a saddle-ride-type vehicle according to claim 1, wherein said actuating mechanism comprises:

an electrically-operated motor, a worm mounted on a rotary shaft of said electrically-operated motor, said worm wheel enmeshed with said worm, wherein power is transmitted from said worm wheel to said master cylinder by said power transmission member, and said rotary shaft supporting said worm wheel and said power transmission member, such that said worm wheel and said power transmission member rotate relative to each other, wherein said second operation quantity detector is provided for detecting a rotational angle of said rotary shaft of said worm wheel.

5. A clutch actuator device of a saddle-ride-type vehicle according to claim 2,
- wherein said actuating mechanism comprises:
    - an electrically-operated motor,
    - a worm mounted on a rotary shaft of said electrically-operated motor,
    - said worm wheel enmeshed with said worm, wherein power is transmitted from said worm wheel to said master cylinder by said power transmission member; and
    - said rotary shaft supporting said worm wheel and said power transmission member, such that said worm wheel and said power transmission member rotate relative to each other,
- wherein said second operation quantity detector is provided for detecting a rotational angle of said rotary shaft of said worm wheel.

6. A clutch actuator device of a saddle-ride-type vehicle according to claim 3,
- wherein said actuating mechanism comprises:
    - an electrically-operated motor,
    - a worm mounted on a rotary shaft of said electrically-operated motor, and
    - said worm wheel enmeshed with said worm, wherein power is transmitted from said worm wheel to said master cylinder by said power transmission member; and
    - said rotary shaft supporting said worm wheel and said power transmission member, such that said worm wheel and said power transmission member rotate relative to each other,
- wherein said second operation quantity detector is provided for detecting a rotational angle of said rotary shaft of said worm wheel.

\* \* \* \* \*